US 6,693,559 B1

(12) United States Patent
Gyde et al.

(10) Patent No.: US 6,693,559 B1
(45) Date of Patent: Feb. 17, 2004

(54) SYSTEM AND METHOD FOR FLIGHT MODE ANNUNCIATORS

(75) Inventors: Mike G. Gyde, Cave Creek, AZ (US); Matthew Hilbert, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 231 days.

(21) Appl. No.: 09/679,924

(22) Filed: Oct. 5, 2000

Related U.S. Application Data
(60) Provisional application No. 60/233,825, filed on Sep. 19, 2000.

(51) Int. Cl.[7] .............................................. G01C 21/00
(52) U.S. Cl. ....................... 340/974; 244/181; 340/973; 701/7; 701/14
(58) Field of Search ................................ 340/963, 971, 340/973, 974, 975, 977, 979, 980; 701/3, 4, 9, 14; 244/181

(56) References Cited

U.S. PATENT DOCUMENTS

| | | | | | |
|---|---|---|---|---|---|
| 4,860,007 A | * | 8/1989 | Konicke et al. | ............ | 340/979 |
| 5,031,102 A | * | 7/1991 | Robbins et al. | ............ | 244/181 |
| 5,523,949 A | * | 6/1996 | Agate et al. | | |
| 5,931,874 A | | 8/1999 | Ebert et al. | ..................... | 701/1 |
| 6,057,786 A | | 5/2000 | Briffe et al. | | |
| 6,104,969 A | | 8/2000 | Beeks | ........................... | 701/1 |
| 6,112,141 A | | 8/2000 | Briffe et al. | ................... | 701/14 |
| 6,188,937 B1 | * | 2/2001 | Sherry et al. | .................. | 701/14 |

FOREIGN PATENT DOCUMENTS

| EP | 0324195 A | 7/1989 |
|---|---|---|
| EP | 0 763 714 A2 | 3/1997 |

* cited by examiner

Primary Examiner—Brent A. Swarthout

(57) ABSTRACT

The pilot's awareness of the aircraft's state is enhanced by supplementing the flight modes area (FMA) in the upper region of the primary flight display (PFD) with additional annunciators. The FMA in the present invention displays, in the active lateral modes region, the name of the waypoint the aircraft is flying towards and, if the waypoint is part of a published procedure, the procedure name is displayed in this area. Moreover, if the controls of the aircraft are set for a specific target, then the target, along with the mode annunciators, are displayed in the active vertical modes region of the FMA. Furthermore, if the aircraft starts to deviate from the preselected altitude, the pilot is alerted of the uncoordinated condition by a CHECK ASEL annunciation which is displayed in the lower center region of the FMA, namely below the autopilot (AP) annunciator. Additionally, if the approach has been programmed, but the pilot has not yet armed an approach, the crew is alerted to the condition by an annunciation which is displayed in the lower center region of the FMA in sufficient time to allow for normal capture of the approach such that the pilot can select the approach (APR) pushbutton to arm the system for the approach.

9 Claims, 4 Drawing Sheets

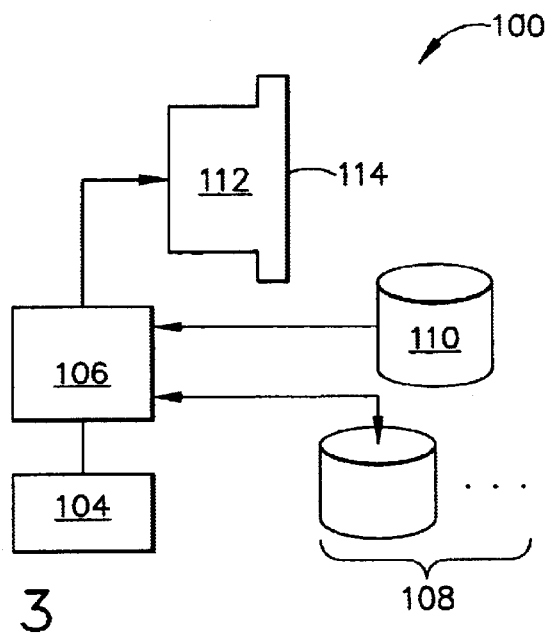
FIG. 3
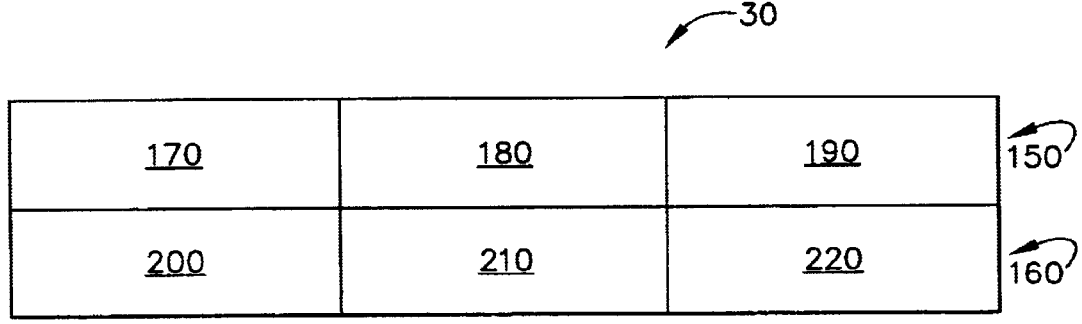
FIG. 4
| LNAV mzb | ←AP | FPA |
|---|---|---|
| ARMED LATERAL MODES | | ARMED VERTICAL MODES |
FIG. 5

SYSTEM AND METHOD FOR FLIGHT MODE ANNUNCIATORS

REFERENCE TO RELATED APPLICATION

This application claims priority from and the benefit of U.S. Provisional Patent Application Serial No. 60/233,825, filed Sep. 19, 2000, the entire contents of which are hereby incorporated by reference.

TECHNICAL FIELD OF THE INVENTION

The present invention relates generally to a system and method for displaying flight mode annunciators, and more particularly, to flight mode annunciators incorporated into the primary flight display (PFD) for improving a pilot's situational awareness.

BACKGROUND

A pilot's awareness and coordination of various aircraft modes and conditions is often critical to optimum aircraft performance and safety. For example, the pilot should be aware of the aircraft's automation state and the pilot should be able to easily coordinate the flight director modes. Moreover, the pilot should be able to easily view and coordinate the tracking of the aircraft to current modes and targets. However, existing cockpit controls, which may be of the panel mounted variety or of the head up display (HUD) variety and which may be commonly found in commercial, military, and civilian aircraft, include various systems distributed throughout the cockpit, thereby often requiring the pilot to intermittently scan various areas of the cockpit to obtain and analyze the aircraft information. As such, pilots may fly certain modes in an inappropriate manner.

To assist the pilot, aircraft flight displays continue to advance in sophistication, achieving increasingly higher levels of information density and, consequently, presenting a greater amount of visual information to be perceived and understood by the operator. In many applications, it is often important that visual displays provide a proper cognitive mapping between what the operator is trying to achieve and the information available to accomplish the task. As a result, such systems increasingly utilize human-factor design principles in order to build instrumentation and controls that work cooperatively with human operators. Accordingly, the Federal Aviation Administration (FM) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, annunciators, and the like. Similarly, detailed guidelines related to electronic displays can be found in FAA Advisory Circular 20–88A, *Guidelines on the Marking of Aircraft Powerplant Instruments* (Sept. 1985), both of which are incorporated by reference.

An exemplary primary flight display (PFD) 5 generally includes an Attitude Direction Indicator (ADI) 10, a heading source indicator (HSI) 25, a Flight Modes Area (FMA) 30 and other critical annunciators, such as, for example, altitude selection (ASEL) 50, current altitude 55 and vertical speed 60 (see FIG. 1). An ADI typically indicates a reference point or line, e.g., a representative horizon line, relative to the position of the host aircraft. The host aircraft may be represented by a fixed element of the ADI 10 display and most ADIs depict the aircraft wings as one or more horizontal marks that are centered with respect to the display screen. The horizon line rendered on the ADI 10 display may move up and down in response to changes in the pitch of the aircraft. Similarly, the horizon line may rotate in response to changes in the roll of the aircraft. More particularly, ADI 10 includes an indicator for the flight director 15 and the aircraft 20, wherein the flight director 15 conforms to the modes set by the pilot and provides guidance based upon the preselected modes. Using the ADI, the pilot can appropriately manipulate the aircraft relative to the flight director 15. If the autopilot is engaged, the aircraft automatically follows the flight director 15. Without the autopilot, the pilot receives guidance, but the pilot manually directs the aircraft in the direction of the flight director 15.

Many conventional ADIs include a blue colored portion above the horizon line (representing the sky) and a brown or tan colored portion below the horizon line (representing the Earth). This color scheme is employed to enable pilots to determine the attitude of the aircraft at any given moment. The color scheme is particularly helpful in situations where the pilot may be temporarily distracted or in situations where visibility is impaired. While an ADI having such a color scheme may be suitable in many situations, a pilot may have difficulty detecting small changes in tilt and roll based on slight movement of the horizon line and/or slight movement of the blue and brown colored segments.

ADIs and other related instrumentation may display alphanumeric or graphical information related to the direction of the aircraft relative to a specific reference point such as the horizon. However, the manner in which such information is typically displayed requires the pilot to scan the instrumentation panel (or HUD field), locate the displayed information, and interpret the information. Depending upon the current flight conditions, it may be difficult for a pilot to quickly and easily locate and digest such information. Consequently, the reaction time associated with adjusting the direction of the aircraft toward the reference point may be undesirably long.

The FMA 30 is typically located in the upper portion of the PFD 5 because this area is in the pilot's primary scanning view. As such, in a typical aircraft, an area is normally reserved in the upper portion of PFD 5 for important annunciators, such as, for example, an upper row of active annunciators, including the status of the engagement of the autopilot functions, and a lower row indicating if the modes are currently armed. Additionally, the lateral modes are indicated on the left side of FMA 30, while the vertical modes are indicated on the right side of the FMA 30. Moreover, the modes of the aircraft are often indicated on PFD 5 by 3–5 letter acronyms, such as, for example, LNAV (lateral navigation) is an active lateral mode, AP (autopilot) for the autopilot engage status and FPA (flight path angle) is an active vertical mode.

Although critical information is located within the PFD 5, important information related to the aircraft's state, modes and targets is typically missing from PFD 5, wherein the additional information and annunciators regarding the aircraft would substantially assist a pilot's awareness of aircraft conditions. For example, if the approach has been programmed, but the pilot has not yet armed an approach, the pilot needs sufficient time to allow for normal capture of the approach such that the pilot can select the approach (APR) pushbutton to arm the system for the approach. However, many of the fault analysis systems are not located within the PFD 5; and instead, are located in another area of the cockpit which often requires the pilot to remove PFD 5 from his/her line of vision and scan over to another area of the cockpit displays. In particular, the Crew Alerting System (CAS) includes only certain fault annunciations, so the pilot only scans over to the CAS to analyze if the certain faults may exist. As such, systems and methods are needed to overcome these and other limitations of the prior art. Specifically, there is a long felt need for flight mode annunciators incorporated into the PFD which improve a pilot's situational awareness.

BRIEF SUMMARY OF THE INVENTION

The pilot's awareness of the aircraft's state is enhanced by supplementing the flight modes area (FMA) in the upper region of the primary flight display (PFD) with additional annunciators. The FMA in the present invention displays, in the active lateral modes region, the name of the waypoint the aircraft is flying towards and, if the waypoint is part of a published procedure, the procedure name is displayed in this area. Moreover, if the controls of the aircraft are set for a specific target, then the target, along with the mode annunciators, are displayed in the active vertical modes region of the FMA. Furthermore, if the aircraft starts to deviate from the preselected altitude, the pilot is alerted of the uncoordinated condition by a CHECK ASEL annunciation which is displayed in the lower center region of the FMA, namely below the autopilot (AP) annunciator. Additionally, if the approach has been programmed, but the pilot has not yet armed an approach, the crew is alerted to the condition by an annunciation which is displayed in the lower center region of the FMA in sufficient time to allow for normal capture of the approach such that the pilot can select the approach (APR) pushbutton to arm the system for the approach. If more than one annunciator is to be displayed in a location, the most critical annunciator is consistently or intermittently displayed until the critical situation is resolved.

BRIEF DESCRIPTION OF EXEMPLARY DRAWING FIGURES

The subject invention will hereinafter be described in conjunction with the appended drawing figures, wherein like numerals denote like elements, and:

FIG. 3 shows an exemplary primary flight display system in accordance with exemplary embodiments of the present invention;

FIG. 4 shows an exemplary flight mode area (FMA) in accordance with exemplary embodiments of the present invention;

FIG. 5 shows an exemplary FMA wherein is displayed in the active lateral modes region in accordance with exemplary embodiments of the present invention;

Figure 7:
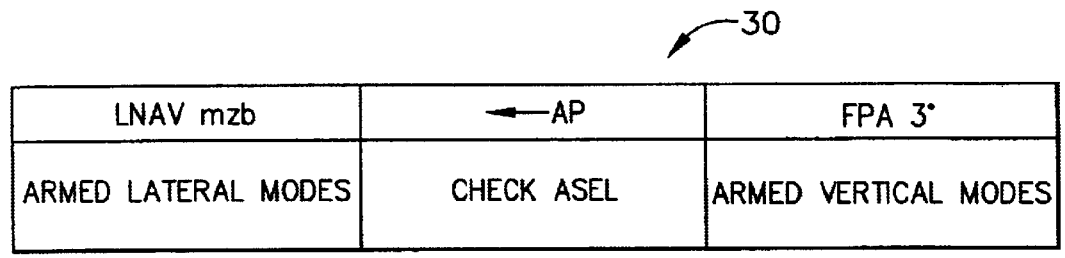
Figure 8:
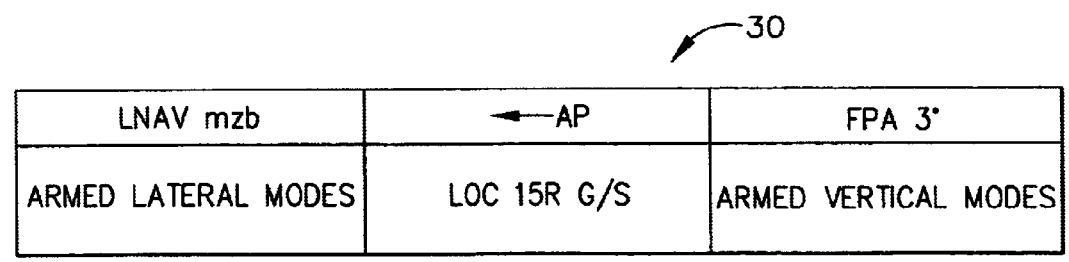

FIG. 7 shows an exemplary FMA wherein the waypoint name ("mzb") is displayed in the active lateral modes region, the flight path angle (3 degrees) is displayed in the active vertical modes region and CHECK ASEL is displayed below the autopilot annunciator in accordance with exemplary embodiments of the present invention; and, FIG. 8 shows an exemplary FMA wherein the waypoint name ("mzb") is displayed in the active lateral modes region, the flight path angle (3 degrees) is displayed in the active vertical modes region and an approach excitement annunciator is displayed below the autopilot annunciator in accordance with exemplary embodiments of the present invention.

DETAILED DESCRIPTION OF EXEMPLARY EMBODIMENTS

Systems and methods in accordance with various aspects of the present invention provide an improved primary flight display (PFD) 5 with an enhanced flight mode area (FMA) (see FIG. 2) to enhance a pilot's situational awareness. In an exemplary embodiment, the present invention is implemented with a large 14.1" diagonal display to provide much more display surface area in front of the pilot. As such, the present invention is configured to allow the enlargement and enhancement of the annunciation areas while substantially maintaining the surface area allotted for other displays. Alternatively, the present invention is implemented within an 8"×10" display or any other suitable display size.

In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein. Moreover, it should be understood that the exemplary process illustrated may include more or less steps or may be performed in the context of a larger processing scheme. Furthermore, the various flowcharts or methods presented in the drawing figures or the specification are not to be construed as limiting the order in which the individual process steps may be performed.

It should be appreciated that the particular implementations shown and described herein are illustrative of the invention and its best mode and are not intended to otherwise limit the scope of the present invention in any way. Indeed, for the sake of brevity, conventional techniques and components related to aircraft attitude detection, flight instrumentation, liquid crystal displays, HUDs, image rendering, landing and guidance methodologies, and other functional aspects of the systems (and components of the individual operating components of the systems) may not be described in detail herein. Furthermore, the PFD display images shown in the various figures are illustrative in nature and are not intended to limit the scope or applicability of the present invention in any way.

Briefly, referring now to FIG. 3, an exemplary PFD system 100 in accordance with various aspects of the present invention comprises a processor 106 configured to communicate with detection element 104, an associated monitor (or monitors) 112, one or more data sources 108, and avionics data 110. In general, a user (e.g., a pilot) located within a vehicle (e.g., aircraft) (not shown) may provide input to processor 106 and receive visual feedback regarding the status of the aircraft via a display 114 produced by monitor 112. PFD system 100 may be suitably configured for use in a commercial aircraft or any vehicle in which modes, targets, attitudes and/or relative position information is to be displayed. However, the example system described herein relates to an aircraft PFD system. PFD system 100 is preferably configured such that display element 112 produces an enhanced rendering of the mode and target information, as viewed by the pilot of the aircraft. A number of aspects of display element 112 (which are controlled by processor 106 in a practical embodiment) may contribute to the improved contents and appearance of the PFD 114, thus increasing the situational awareness of the pilot and/or flight crew. The image generation and display aspects of the present invention may leverage known techniques such that existing PFD systems can be modified in a straightforward manner to support the different features described herein. In a practical implementation, the concepts of the present invention may be realized in the form of revised display generation software or processing resident at processor 106.

Processor 106 encompasses one more functional blocks used to provide flight management and control, interface with the pilot, and input to monitor 112. Processor 106 may include or cooperate with a mode, position and/or detection element that is capable of determining the mode or position of the vehicle relative to one or more reference locations, points, planes, or targets. In addition, processor 106 may be configured to receive, analyze, condition, and process target and/or bearing data associated with the vehicle. In this regard, processor 106 may include any number of individual microprocessors, flight computers, navigation equipment, memories, storage devices, interface cards, and other standard components known in the art. Moreover, processor 106 may include any number of microprocessor elements, memory elements, power supplies, and other functional components as necessary to support the operation of PFD system 100. In this respect, processor 106 may include or cooperate with any number of software programs or instructions designed to carry out various methods, process tasks, calculations, control functions, and the generation of display signals and other data used by display element 112. For example, processor 106 may be configured to generate an annunciator associated with the position of the aircraft relative to at least one reference location.

In accordance with another preferred feature of the invention, processor 106 is further configured to receive and process information associated with an approach target for the aircraft, e.g., a destination runway. Processor 106 may also be suitably configured to receive and process target and/or bearing data 108 related to an intended destination of the aircraft. In a practical commercial aircraft application, such data 108 may be associated with specific landing coordinates, a runway, or the like. This data 108 may be received by the aircraft via a conventional landing guidance system. As described in more detail below, processor 106 may process data 108 and generate appropriate signals to display element 112 such that display element 112 generates indicia representative of the approach target. Such processors and flight control computers are available from a number of manufacturers such as Honeywell, Inc. In an exemplary embodiment, processor 106 is flight management system (FMS) 106 which, inter alia, formats navigation data and forwards the data to display element 112 for display as an annunciator on display 114.

Detection element 104 is configured to determine the position/attitude of the aircraft during flight. In a practical embodiment, detection element 104 and processor 106 may be integrally contained in a single housing. Detection element 104 may include or cooperate with any number of conventional components, e.g., gyroscopes, global positioning systems, and altimeters, to obtain position or attitude data that is processed by processor 106. The position/attitude data may be associated with one or more of the following parameters: the pitch of the aircraft relative to a reference such as the horizon; the roll of the aircraft relative to its longitudinal axis; the yaw angle of the aircraft relative to a specific heading; the latitude of the aircraft; the longitude of the aircraft; the altitude of the aircraft; and the like. Detection element 104 may utilize well known techniques and commercially available components that are suitably configured to generate the position data. For the sake of brevity, the form and function of such conventional devices and systems will not be described in detail herein.

Display 114 includes various graphical elements associated with the lateral position, vertical position, flight-plan and/or other indicia of the aircraft's operational state as determined from avionics data 110 and/or data sources 108. One skilled in the art will appreciate that the pilot may modify the flight-plan and/or other such indicia graphically in accordance with feedback provided by display 114. Display 114 may be based on a panel mounted display, a HUD projection, or any known technology. In addition to the enhanced features and indicia described in more detail below, display 114 may include any number of conventional elements, e.g., visual indicators, alphanumeric text, lights, and the like. Display element 114 may receive a position signal (or signals) and generate a viewable image or annunciator in response to the position signal. In this context, the position signal may be representative of position information that has been obtained and processed by processor 106.

Avionics data 110 includes standard information related to the state of the aircraft. Data sources 108 include various types of data required by the system, for example, flight plan data, data related to airways, navigational aids (Navaids), symbol textures, navigational data, obstructions, font textures, taxi registration, Special Use Airspace, political boundaries, COM frequencies (enroute and airports), approach info, and the like. Display element 112 may include any display monitor suitable for displaying the various symbols and information detailed below. Many currently known monitors are suitable for this task, including various CRT and flat-panel display systems. In an exemplary embodiment, display element 112 includes a primary flight display (PFD) 5, as shown in FIG. 2, with various annunciators.

Many of the prior art annunciators are distributed throughout the cockpit. For example, the waypoints (physical locations, navigation sources and/or the like in the flight plan) are typically located on the Map which is displayed on the MFD (Multifunction Display) area which is usually located in a separate display adjacent to the PFD and the CDU (Control and Display Unit) which are themselves usually located in the pedestal area of the cockpit. Moreover, the targets are usually located on their respective scales (speed, altitude, vertical speed, heading, etc.) which are in the PFD (Speed is usually directly to the left of the ADI, Altitude is usually to the right of the ADI, and Vertical Speed is usually in the HSI area or to the right of the Altitude scale) and/or on a Flight Guidance Controller located in the glareshield area of the cockpit. However, in an exemplary embodiment of the present invention and with respect to FIG. 2, the pilot's awareness of the aircraft's state is enhanced by the incorporation of additional annunciators into FMA 30. FMA 30 is located on top of PFD 5 because, inter alia, this area is in the pilot's primary scanning view. While the present invention contemplates the incorporation of the additional annunciators disclosed herein into any area of PFD 5 or into any area of FMA 30, an exemplary embodiment of the present invention incorporates additional annunciators into certain locations within FMA 30 located in the upper region of PFD 5.

Moreover, if more than one annunciator is to be displayed in a location, in an exemplary embodiment, FMS 106 may consistently or intermittently display the most critical annunciator until the critical situation is resolved. For example, the Check ASEL annunciator (see FIG. 7) or the approach annunciator (see FIG. 8) will most likely be prioritized over other annunciators. Additionally, the additional annunciators disclosed herein may be displayed in addition to the existing possible annunciators, in place of the existing annunciators, overlayed over the existing annunciators or any other joint, alternating or substituted display combination. An exemplary PFD 5 may be used for display element 114. Moreover, PFD 5 and/or FMA 30 may be defined by any boundary that is appropriate for the particular application. PFD 5 and/or FMA 30 may be incorporated within a larger display element, and/or it may include any number of related or independent display elements, control elements, or instrumentation. The displayed features described herein may be suitably rendered on FMA 30 in accordance with any number of known techniques and the displays may be achieved in any form or combinations of forms, such as, for example, characters, colors, symbols, lights, blinking lights, 3-D forms, differing movements, texture, shading, patterning, overlay and/or any other distinguishable display characteristics or indicia.

Figure 1:
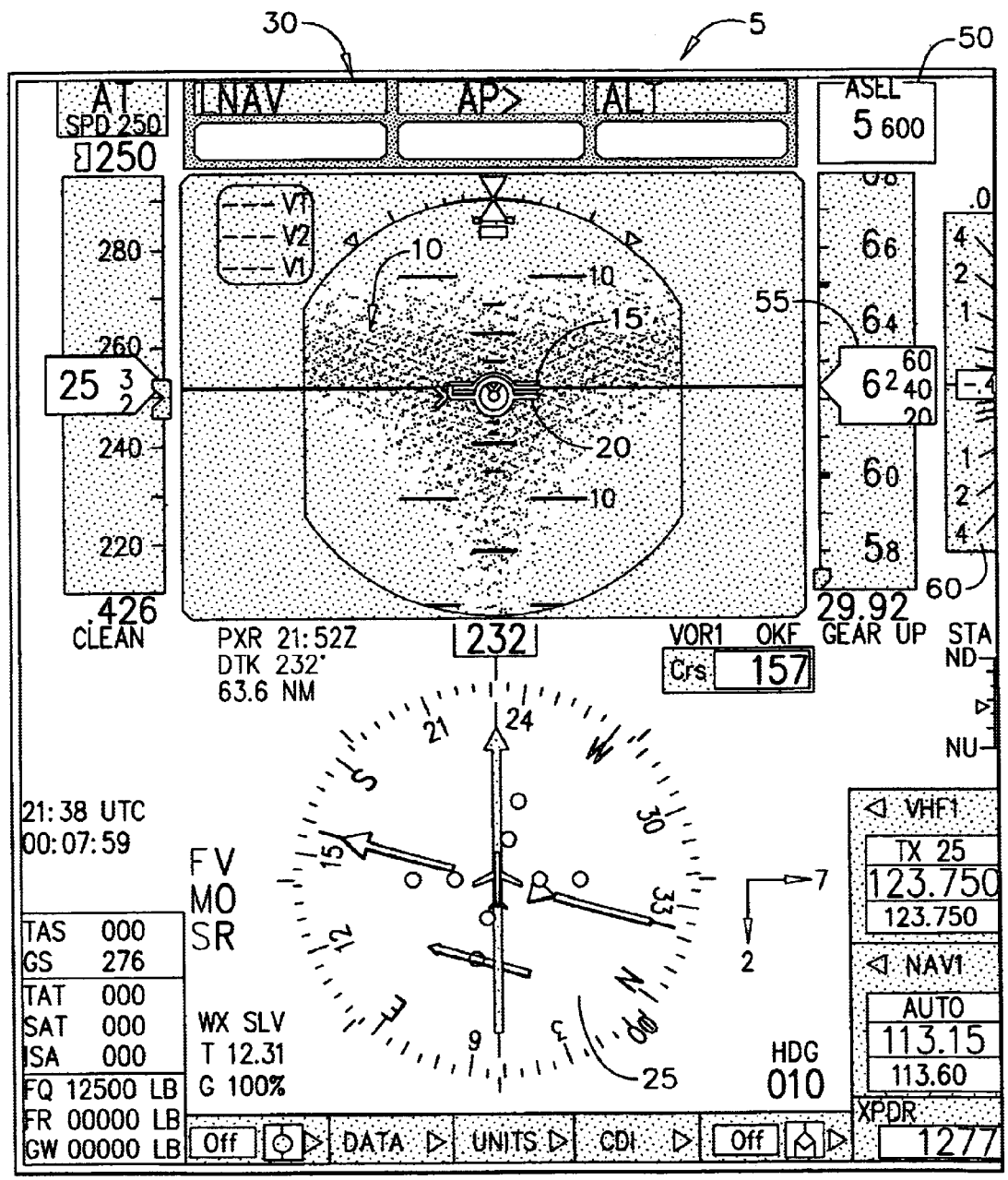
FIG. 1 shows an exemplary prior art primary flight display.
Figure 2:
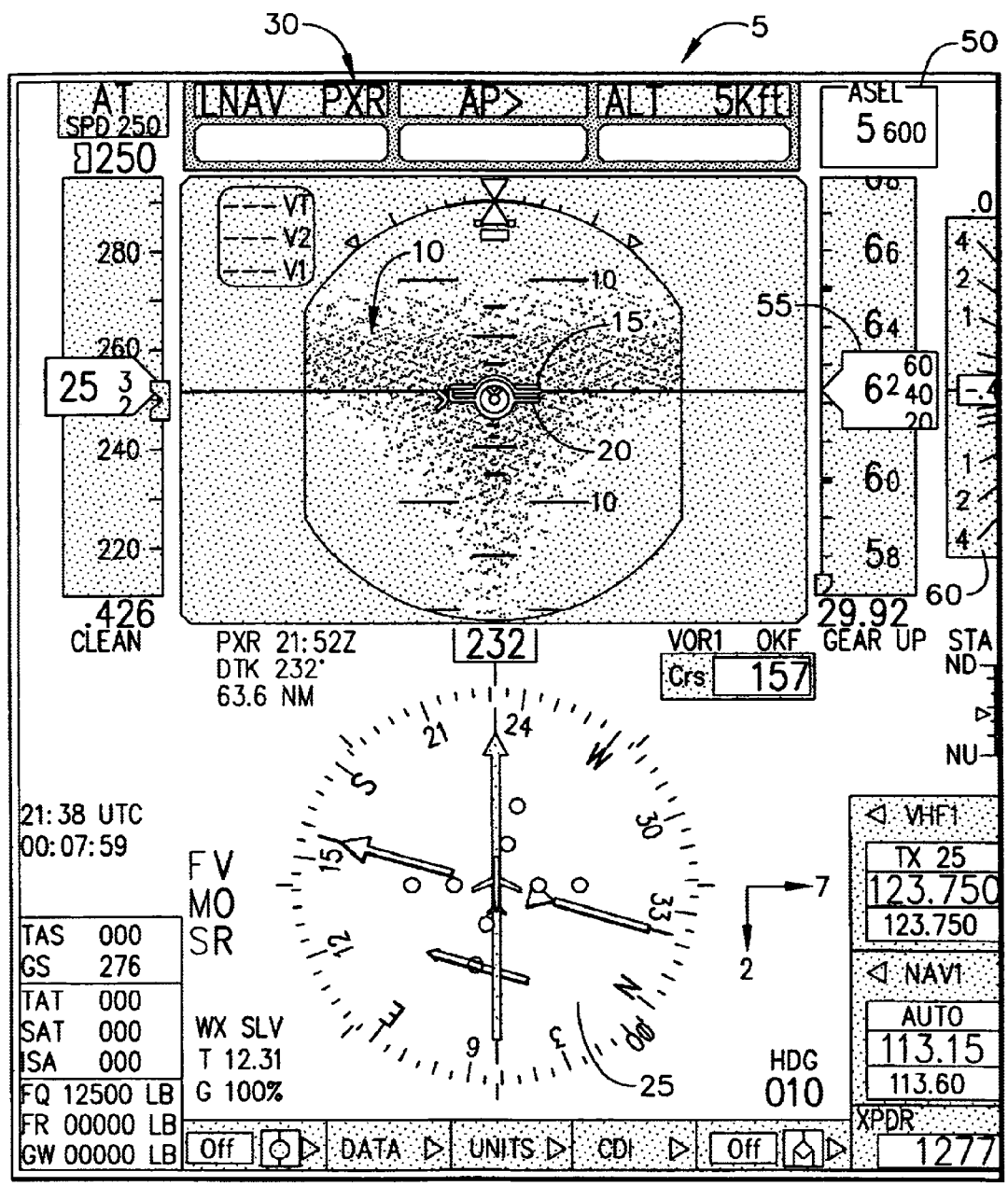
FIG. 2 shows an exemplary primary flight display including an enhanced flight mode area in accordance with exemplary embodiments of the present invention.

With reference to FIGS. 2 and 4, an exemplary area, known as the flight modes area (FMA) 30, is reserved in the upper region of PFD 5 for important annunciators, such as, for example, active lateral modes in area 170, active vertical modes in area 190, armed lateral modes in area 200, armed vertical modes in area 220, and the status of the engagement of the autopilot functions in area 180. As such, row 150 displays the active annunciators and row 160 indicates if the modes are currently armed. Additionally, the lateral modes are indicated on the left side of FMA 30, while the vertical modes are indicated on the right side of FMA 30. Area 210 currently exists in many FMAs; however, this area is typically nonfunctional and unutilized. Moreover, the modes of the aircraft are often indicated on PFD 5 by 3–5 letter acronyms, such as, for example, LNAV (lateral navigation) is an active lateral mode, AP (autopilot) for the autopilot engage status and FPA (flight path angle) is an active vertical mode.

FMA 30 in the present invention displays, in the active lateral modes region (area 170 in FIG. 4), the following possible exemplary annunciators when an annunciator is a top level active mode: LNAV [lateral navigation to a waypoint or procedure name], ROL [ roll of the aircraft in degrees], HDG/TRK [heading and tracking of the aircraft in degrees], or LOC [localizer for a particular runway if using the FMS 106]. With respect to armed lateral modes, the following exemplary annunciators may be displayed: LOC [localizer for a particular runway if using FMS 106] and LNAV [lateral navigation to a waypoint or procedure name]. However, the LNAV target may not be displayed when LNAV is armed, due to the fact that the pilot may not be able to tell what the actual target will be when it becomes engaged and showing a target when the mode is armed, and having the target change on engaging the mode, may be misleading. In addition to displaying the existing top level mode in area 170, the tuned frequency of the waypoint that the aircraft is flying towards may also be obtained from FMS 106 and displayed in the active lateral mode region (area 170 in FIG. 4). Alternatively, if the waypoint (e.g., "mzb", "pxr", etc.) is part of a published procedure, the FMS 106 obtains the code for the procedure name (e.g., "ILS 12L", "GPS 3R", etc.) from a database (e.g., look-up table) and displays it in this area in place of or in addition to the tuned frequency. FIG. 5 shows an exemplary FMA in accordance with the present invention wherein the waypoint name ("mzb") is displayed in the active lateral modes region (area 170 in FIG. 4).

Figure 6:
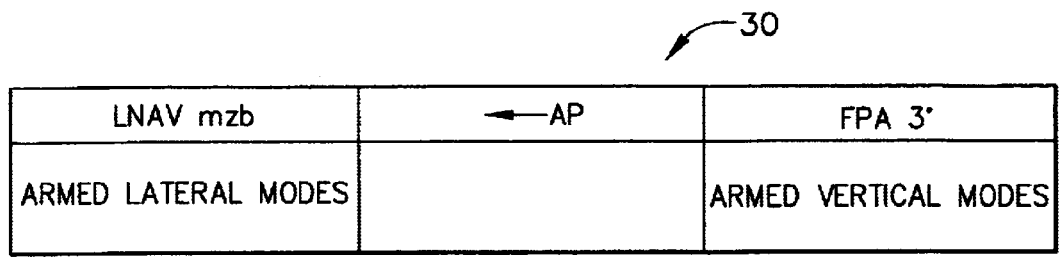
FIG. 6 shows an exemplary FMA wherein the waypoint name ("mzb") is displayed in the active lateral modes region and the flight path angle (3 degrees) is displayed in the active vertical modes region in accordance with exemplary embodiments of the present invention.

The following are examples of the vertical mode annunciators which may be displayed if an annunciator is an active top level mode: VCLB (vertical climb in altitude units or speed (knots/mach)), VGP (vertical glidepath in altitude units or degree units), VASEL (vertical altitude selection in altitude units), VALT (vertical altitude in altitude units), VPTH (vertical path in altitude units or degree units), FPA (flight path angle in degrees), ASEL (altitude selection in altitude units), ALT (altitude in altitude units), CLB (climb in knots), VS (vertical speed in ft/min), GA TO GS (glideangle to glideslope in degrees), WSHR (windshear), GP (glidepath in degrees), FLC (in altitude or speed units) and VFLC (vertical FLC in altitude or speed units). The following are examples of armed vertical mode annunciations which may be displayed if the annunciator is an active top level mode: VNAV (vertical navigation), GS (glideslope in degrees), VGP and glidepath (GP in TBD). However, the controls/modes of the aircraft are set for a specific target (e.g., vertical speed, altitude, flight path angle, heading and/or the like) and various controls throughout existing cockpits typically display the target and the related modes. In an exemplary embodiment of the present invention, in addition to displaying the existing top level mode annunciator (e.g., a flight path angle (FPA)) in the active vertical modes region of FMA 30 (area 190 of FIG. 4), the present system also obtains from FMS 106 and displays the aircraft's target (e.g., FPA 3 degrees), namely where the mode is tracking towards. FIG. 6 shows an exemplary FMA wherein, in addition to the waypoint name ("mzb") being displayed in the active lateral modes region, the flight path angle (3 degrees in FIG. 6) is displayed in the active vertical modes region (area 190 in FIG. 4).

With respect to the autopilot feature and as shown in FIGS. 2 and 4, an exemplary autopilot engage status and couple status annunciation is located in area 180, namely between the active vertical and lateral mode annunciators. Engage status is shown by the reverse video status of the FMA. Couple status determines which PFD displayed ADC and IRS data sources are used for flight guidance and is annunciated by an arrow. For example, if ADC 1 and IRS 3 are displayed on PFD 1 and ADC 2, and IRS 2 are displayed on PFD 2, "coupled left" would mean that ADC 1 and IRS 3 would be the sources for the data feeding the FMS 106 (i.e. selected data). Moreover, the autopilot annunciator may include an arrow indicating the couple status by the autopilot, such as, for example, ←AP, AP→, or ←AP→. However, an empty field typically exists below the autopilot annunciator (area 210) and the present invention takes advantage of this empty field by using the field for additional important annunciators.

In the prior art, a CHECK ASEL 50 alert typically includes two existing monitors, namely the uncoordinated altitude change which was usually annunciated in the Altitude Preselector Field typically located in the Altitude tape area of the cockpit and the FMS Descents Alert which was only annunciated in the FMS MCDU Scratchpad typically located in the pedestal area of the cockpit. However, during a flight, ASEL 50 is typically always armed, but pilots often fly an uncoordinated ASEL 50, thereby minimizing the likelihood of the aircraft capturing the ASEL 50. Examples of uncoordinated ASEL 50s include flying away from a pre-selected altitude or without a preselected altitude. As such, the pilot may believe that his/her aircraft may eventually capture the ASEL 50; however, because the pilot may be flying away from the ASEL 50, the aircraft may not capture the ASEL 50, thereby possibly resulting in potential conflicts with other traffic or terrain.

Therefore, an exemplary embodiment of the present invention incorporates a Check ASEL 50 excitement annunciation. In this regard, if the aircraft starts to deviate from the preselected altitude, detection element 104 suitably detects the deviation and reports the deviation to the autopilot system. The autopilot then sends a signal to display element 112 to alert the pilot of the uncoordinated condition by an annunciation, such as, for example, an amber "CHECK ASEL" which is displayed in the lower center region of the FMA 30, namely below the autopilot (AP) annunciator (area 210 in FIG. 4). FIG. 7 shows an exemplary FMA wherein, in addition to the waypoint name ("mzb") which is displayed in the active lateral modes region and the flight path angle (3 degrees) which is displayed in the active vertical modes region, the CHECK ASEL is also displayed below the autopilot annunciator (area 210 in FIG. 4). In another exemplary CHECK ASEL alert embodiment, when the aircraft is approaching a Top of Descent point, FMS 106 checks to verify that the altitude preselector has been dialed down, so that FMS 106 can initiate the descent. If the preselector is not dialed down, the CHECK ASEL message is invoked. However, one skilled in the art will appreciate that this alert situation may be operational in any vertical mode which deviates from preselected altitude.

Additionally in the prior art, during an approach, the pilot typically "arms" the approach (i.e., arms the localizer and glideslope) by pressing a button on the guidance panel which arms the approach modes (localizer and glideslope) and tunes the appropriate guides, frequencies and/or the like to their pre-selected optimal modes. The pilot also tunes the Radios. When the localizer beam (lateral guidance) captures the aircraft, the localizer is active and the localizer beam directs the aircraft. Next, when the ILS glideslope (vertical guidance) also captures the aircraft, the glidescope is active and the glidescope beam directs the aircraft to pitch down to the typical 3 degree glidescope decent path to the runway for a smooth landing. However, the aircraft will not necessarily have appropriate guidance until the aircraft is within the range of its localizer transmission and ILS glideslope transmission. As such, before the aircraft is within range, the pilot may be unaware that the approach has not yet been armed. If the approach is not armed, the aircraft may fly through the guidance beams without being captured by the beams. Notably, if the aircraft flies through the guidance beams, the aircraft may unintentionally end up in restricted airspace.

Therefore, with respect to an exemplary approach excitement annunciation in accordance with the present invention, if the approach has been programmed, but the pilot has not yet armed an approach, detection element 104 detects the localizer and queries FMS 106 to determine if the approach is armed. If the approach is not armed, FMS 106 transmits a signal to display element 112 in order to alert the crew to the condition by an annunciation which informs the pilots of the localizer which the aircraft should be tuned, such as, for example, an amber "LOC 15R G/S" [localizer (the lateral mode which will be armed), the runway the plane will be landing on (i.e., 15 right), Glideslope (the vertical mode which will be armed)]. The annunciation is based on existing information either within the FMS 106 (the approach selection or the distance from the airport) or the Radios (a tuned ILS frequency). Moreover, in an exemplary embodiment, the annunciation is displayed in the lower center region of the FMA 30 (area 210 in FIG. 4) in sufficient time to allow for normal capture of the approach such that the pilot can select the approach (APR) pushbutton to arm the system for the approach. FIG. 8 shows an exemplary FMA wherein, in addition to the waypoint name ("mzb") which is displayed in the active lateral modes region and the flight path angle (3 degrees) which is displayed in the active vertical modes region, an approach excitement annunciator is also displayed below the autopilot annunciator (area 210 in FIG. 4).

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

We claim:

1. A primary flight display (PDF) system for an aircraft configured to display a mode and an annunciator in a flight mode area (FMA) integral with and above displays of other flight information, said FMA comprising:

a plurality of active mode displays located horizontally above the PDF, a plurality of displays located beneath each of the active mode displays for displaying arming information and other critical information, a first of the active mode displays displaying an active lateral mode together with an annunciator relating to the active lateral mode, a second of the active mode displays displaying an active vertical mode together with an annunciator relating to the vertical active mode, a third of the active mode displays located between the first and second active mode displays and displaying autopilot information, a first and a second of the displays located beneath the active mode displays displaying information as to whether the active mode display above it is armed, and a display beneath the autopilot display, in the event that two events should be displayed, displays the more critical of the events.

2. A PPD as set forth in claim 1 wherein the active lateral mode display additionally displays a waypoint annunciator.

3. A PDF as set forth in claim 1 wherein the vertical active mode display additionally displays a target annunciator.

4. A PDF as set forth in claim 1 wherein the display beneath the autopilot display displays check ASEL information if the altitude of the aircraft deviates from a preestablished altitude.

5. A PDF as set forth in claim 1 wherein the display beneath the autopilot display displays an approach excitement annunciator.

6. A PDF as set forth in claim 2 wherein the waypoint annunciator is a procedure name.

7. A PDF as set forth in claim 3 wherein the target annunciator is a vertical speed.

8. A PDF as set forth in claim 3 wherein the target annunciator is an altitude.

9. In a primary flight display (PDF) system for an aircraft configured to display a mode and an annunciator in a flight mode area (FMA) integral with and above displays of other flight information, a method for displaying said mode and annunciator information comprising:

providing a plurality of active mode displays located horizontally above the PDF, providing a plurality of displays located beneath each of the active mode displays for displaying arming information and other critical information, a first of the active mode displays displaying an active lateral mode together with an annunciator relating to the active lateral mode, a second of the active mode displays displaying an active vertical mode together with an annunciator relating to the vertical active mode, a third of the active mode displays located between the first and second active mode displays and displaying autopilot information, a first and a second of the displays located beneath the active mode displays displaying information as to whether the active mode display above it is armed, and a display beneath the autopilot display, in the event that two events should be displayed, displays the more critical of the events.

* * * * *

UNITED STATES PATENT AND TRADEMARK OFFICE
CERTIFICATE OF CORRECTION

PATENT NO. : 6,693,559 B1
DATED : February 17, 2004
INVENTOR(S) : Mike G. Gyde et al.

It is certified that error appears in the above-identified patent and that said Letters Patent is hereby corrected as shown below:

Column 10,
Line 22, "A primary flight display (PDF)…" should read — A primary flight display (PFD)… --
Line 27, "…above the PDF," should read -- …above the PFD, --
Line 46, "A PPD as set forth…" should read -- A PFD as set forth… --
Lines 48, 50, 54, 57, 59 and 61, "A PDF as set forth…" should read -- A PFD as set forth… --
Line 63, "In a primary flight display (PDF) system…" should read -- In a primary flight display (PFD) system… --

Column 11,
Line 2, "…horizontally above the PDF," should read -- …horizontally above the PFD, --

Signed and Sealed this

Twenty-second Day of June, 2004

JON W. DUDAS
*Acting Director of the United States Patent and Trademark Office*